United States Patent [19]

Wheeler et al.

[11] 3,902,003

[45] Aug. 26, 1975

[54] ELECTRICAL DEVICE WITH ELECTRODE CONNECTIONS

[75] Inventors: Clark Ramsey Wheeler, Somerville; Raymond Karl Reusch, Basking Ridge, both of N.J.

[73] Assignee: RCA Corporation, New York, N.Y.

[22] Filed: May 20, 1974

[21] Appl. No.: 471,554

[52] U.S. Cl. ................ 174/68.5; 29/193.5; 29/626; 174/52 S; 313/510; 313/519; 357/70

[51] Int. Cl.$^2$ ..................... H01J 61/66; H01J 63/02

[58] Field of Search .......... 174/DIG. 3, 52 S, 52 PE, 174/68.5; 317/101 CC, 101 A; 340/324 M, 336; 313/483, 484, 217, 169.5 PV, 517, 518, 519, 510; 29/626, 627, 589–591, 193, 193.5; 357/70

[56] References Cited

UNITED STATES PATENTS

| | | | |
|---|---|---|---|
| 3,529,073 | 9/1970 | Leonard | 174/52 S |
| 3,800,178 | 3/1974 | Farina | 313/217 X |

*Primary Examiner*—Darrell L. Clay

*Attorney, Agent, or Firm*—Glenn H. Bruestle; Robert J. Boivin

[57] ABSTRACT

Overlaid alignment and mounting of a series of grid electrodes in spaced apart relation to a plurality of corresponding indicia electrodes on a substrate member of a display device is provided. A grid retaining member includes a series of grids retained by common opposing sides of a flex removable frame. Depression channels are provided at the retained ends of the grids whereby mounting pads are provided for accurately spacing grid and indicia surface portions, and whereby the various ones of the series of grids may be secured to corresponding ones of a series of terminal pads on the substrate. Protrusions from a base carrier member engage the peripheral walls of the various other members to provide alignment of grid surface portions with corresponding ones of the indicia electrodes.

A method is described in which the members are internested in overlaid sequence above the base carrier member whereby fixed spaced-apart alignment of the grid and indicia surfaces is accomplished and whereby contact between various corresponding ones of the mounting and terminal pads is achieved. The respective grid mounting pads are then secured to corresponding ones of the terminal pads along the substrate member. The opposing side portions of the frame are thereafter flexibly broken away to provide electrical isolation of the grid electrodes.

6 Claims, 2 Drawing Figures

ELECTRICAL DEVICE WITH ELECTRODE CONNECTIONS

BACKGROUND OF THE INVENTION

The present invention relates to apparatus and method of aligning and securing a plurality of isolated electrode members in spaced-apart planar relationship to a plurality of corresponding surface regions of another member. More particularly, the present invention relates to a multi-indicia display device of the luminescent or gas discharge type wherein a plurality of planar light permeable grids or meshes are mounted as electrodes in spaced-apart planar relation to individual indicia electrodes disposed on the planar surface of another member.

In the assembly of multi-indicia display devices such as, for example, described in U.S. Pat. No. 3,800,178, issued to P. L. Farina on Mar. 26, 1974, an apparatus and method are desired which permit the rapid, efficient, and economical assembly of a series of planar foraminate electrode portions in spaced-apart aligned relation to each other, and in substantially parallel spaced-apart relation to another series of corresponding indicia electrodes on a planar surface.

SUMMARY OF THE INVENTION

An apparatus and method are disclosed for aligning and securing a series electrode surface portions of a first electrode means retaining member in spaced-apart overlay facing relation to a corresponding series of electrode surface portions of a second electrode means retaining member. The second electrode means retaining member includes a plurality of second electrodes retained by common opposing sides of a removable frame. Channel depressions are provided at the retained ends of the series of second electrodes. The channel depressions provide separate mounting pads for each of the second electrodes. The channel depressions also provide accurate spacing of corresponding facing ones of the electrode surface portions of the first and second electrode retaining members. Various ones of the series of second electrodes are secured to various corresponding ones of a series of terminal pads on the first electrode means retaining member. A means of aligning various members of the apparatus relative to each other is provided.

In the method, the second electrode means retaining member is formed and internested in overlaid sequence with the first electrode means retaining member whereby fixed spaced-apart alignment of the facing first and second electrode surface portions is accomplished and whereby contact between corresponding ones of the mounting and termination pads is achieved. The various second electrode mounting pads are then secured to corresponding ones of the terminal pads and the common opposing sides at the frame are thereafter removed.

DETAILED DESCRIPTION

Figure 1:
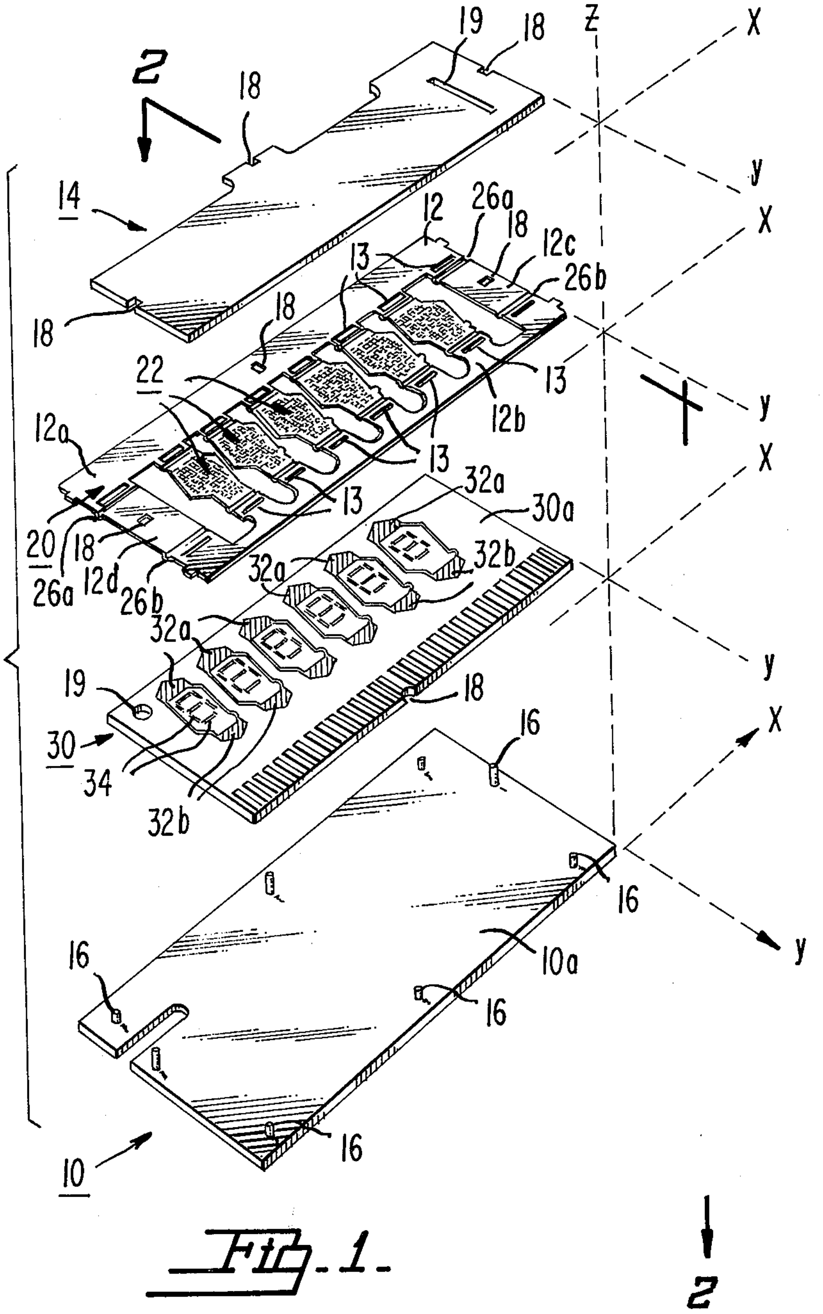
FIG. 1 is an exploded view of a fixture and electrode assembly made in accordance with the invention.

Referring to FIG. 1, there is shown as one embodiment of the invention, an apparatus comprising a plurality of fixture and electrode parts for a display device whereby the device may be easily assembled as hereinafter described. An assembly method provides for the assembly and electrical connection of a series of foraminate electrodes or grids 22 to respective metallized termination pads **32*a* and 32*b* which are along a major surface 30*a* of an insulating display substrate 30.**

THE APPARATUS

Prior to device assembly, as hereinafter described, an electrode retaining member or plate 20 is punched, etched, and/or otherwise formed, from a substantially flat metal plate to include a substantially rectangular frame 12 and a series of separated grids 22. The frame 12 includes substantially parallel opposing side portions **12*a* and 12*b* which longitudinally extend (axis x—x) along opposing sides of plate 20. The separated grids 22 laterally extend (axis Y—Y) between frame portions 12*a* and 12*b* of the frame 12, and are physically connected thereto. The grids 22 are arranged and configured to correspond with the arrangement and configuration of associated ones of a series of indicia electrodes 34 along major surface 30*a* of substrate 30.**

Figure 2:
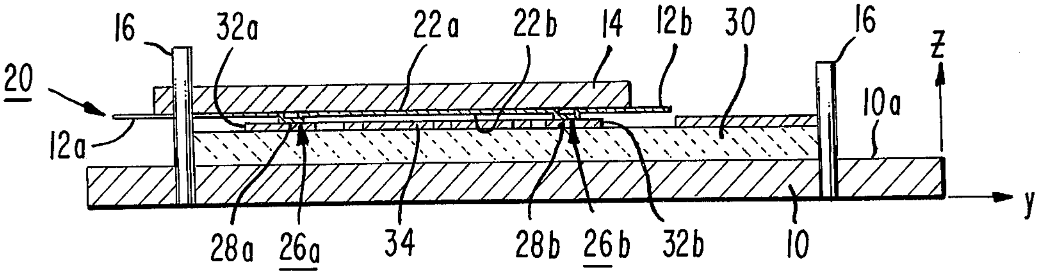
FIG. 2 is an unexploded cross-sectional view taken along lines 2—2 of the assembled fixture and electrode assembly depicted in FIG. 1.

A pair of substantially straight, and parallel, U-shaped channel depressions **26*a* and 26*b* longitudinally extend across the plate 20. These depressions 26*a* and 26*b* longitudinally extend across opposite laterally extending side portions 12*c* and 12*d* of the frame 12 and also across the ends of each of the grids 22 which are physically interconnected to respective side portions 12*a* and 12*b* of the frame 20. These depressions 26*a*,** 26*b* are channel shaped to provide a series of relatively flat or planar mounting pads **28*a* and 28*b* (FIG. 2) for the grids 22 opposite the lowest or bottom-most depression region of each channel. Respective mounting pads 28*a* and 18*b* are thereby provided for each of the various ones of the grids 22 and are vertically spaced-apart (i.e. along axis Z—Z), from an inner grid surface 22*b* (FIG. 2) of each of the various grids 22. The vertical spacing between each inner grid surface 22*b* and its corresponding mounting pads 28*a* and/or 28*b* may be easily modified by suitable adjustment of the depth of each of the respective channel depressions 26*a* and/or 26*b*.**

Each of the channel depressions **26*a*,** 26*b* may be accurately formed for example, by pressing the plate 20 between suitable forming dies. Various ones of the series of mounting pads **28*a*,** 28*b*, are formed so as to correspond in dimensions, planar orientation, and placement to various similarly disposed ones of the termination pads **32*a*,** 32*b* on substrate surface **30*a*. This arrangement insures that contact between the various ones of the mounting pads 28*a*, 28*b*,** may be established with corresponding ones of the termination pads as hereinafter described.

A series of apertures 13 is also punched, etched or otherwise formed in the plate 20. The apertures 13 are respectively situated between various ones of the regions of channel depressions **26*a*, and 26*b* and the interconnected side portions 12*a* and 12*b* of the plate 20. The apertures 13 extend longitudinally across the plate 20 substantially parallel to the channel depressions 26*a* and 26*b*. The apertures 13 are sized, shaped, and positioned to provide resiliently manipulative flex removable weakened regions along the plate 20 whereby the individual frame portions 12*a* and 12*b* may each be removed as a unit, as hereinafter described, from the series of grids 22. The size, shape and orientation of the apertures 13 may be varied to advantage, dependent upon the ease of removal desired and other mechanical design constraints. Other types of weakened regions (i.e. other than apertures 13) may be provided to advantage as an efficient means for the removal of frame portions 12***a* and/or 12*b*. For example, longitudinally weakened indented regions may be formed in the plate 20 whereby adequate removal characteristics are provided.

In all assembly, all of the planar mounting pads 28*a*, 28*b* of the various ones of the grids 22 may be simultaneously joined or secured to various corresponding ones of the termination pads 32*a*, 32*b* on the substrate 30 as for example, by brazing, welding, or other mechanical securing means well known in the prior art and effective for providing electrical connection between the joined members. Prior to such securing, however, the electrode plate 20 is aligned in an assembly fixture with respect to substrate 30, and positioned in facing contact therewith, so that each one of the various inner surface portions 22*b* of the grids 22 is in overlay facing spaced-apart relation to corresponding exposed surface portions of the series of indicia electrodes 34 on the substrate surface 30*a*.

When the grids 22 are properly overlaid and positioned, physical contact between various ones of the series of mounting pads 28*a*, 28*b* is established to corresponding ones of the series of terminal pads 32*a* and 32*b* on the substrate surface 30*a*. The inner grid surfaces 22*b* of the various grids are retained in a desired vertically spaced-apart relation to corresponding exposed surface portions of the indicia electrodes 34 by the suitable formation of the depth of the depressions 26*a* and and 26*b* as previously described.

In the embodiment of FIG. 1, the fixture includes: a base carrier member 10, weight 14 and alignment means for the substrate 30 and the various electrode and fixture members. The alignment means for the electrode and fixture members comprises a plurality of alignment pins 16 which protrude from a major surface 10*a* of the base carrier 10. These alignment pins 16 snugly engage either the peripheral wall surfaces of the various other members at their sides, or the peripheral inner side walls of corresponding receiving apertures 18 of the other members, when these other members are properly internested in overlaid facing aligned relation with respect to the carrier member 10 and each other.

Additional apertures or openings 19, may, for example, also be provided in one or more of the separate members or substrate 30 as required to assemble additional electrodes and/or structural additions such as tubulations, getters, etc. Additional openings 19 may also be provided to cooperate with such additional structure to aid in aligning one or more of the fixture and electrode members or substrate 30.

THE METHOD

The base carrier member 10, electrode plate 20, and display substrate 30 are first assembled in ordered overlay, contacting, sequence to provide alignment of various ones of the series of grids 22 with respect to the various corresponding ones of the series of indicia 34. In accomplishing this aligned assembly step, the electrode plate 20 is simultaneously positioned relative to the surface 30*a* of the substrate 30 to provide contact between various ones of the series of mounting pads 28*a* and 28*b* with corresponding ones of the series of termination pads 32*a*, 32*b*.

In one method, for example, the substrate 30 may be carefully overlaid above the base carrier member 10 and internested in aligned relation therewith by engaging the peripheral walls of the substrate 30 and the receiving apertures 18 with alignment pins 16. In a similar manner, the electrode plate 20 may be thereafter carefully overlaid and internested above the exposed surface of the substrate 30 to similarly engage the alignment pins 16 of the base carrier 10 within corresponding receiving apertures 18.

After the plate 20 is properly positioned and aligned in the above manner with respect to substrate 30 and the base carrier 10, the weight 14 may be gently dropped onto place above the plate 20 to provide adequate conjoining force between various ones of the series of termination pads 32*a* and 32*b* of the substrate 30 and various corresponding ones of the planar mounting pads 28*a* and 28*b* to insure contact therebetween. The weight 14 is designed to provide surface contact between the pads 28 and 32 without permanently deforming any of the planar grids 22 or their channel depressions 26*a*, 26*b*. Corresponding mounting pads 28*a*, 28*b* and termination pads 32*a*, 32*b* are thereafter secured to each other as previously described, as for example, by brazing.

After the securing operation has been completed, the longitudinally extending frame portions 12*a* and 12*b* are removed. Preferably, removal of each portion 12*a* or 12*b* is accomplished by repeatedly bending or flexing each portion with a vertical motion until that respective portion is broken away by the forces created along the weaker flex removable longitudinal regions of weakness defined by the apertures 13. Removal of side portions 12*a*, 12*b* may, however, also be accomplished, along the regions of weakness of plate 26, by other means. For example, a shearing or cutting operation may be performed in lieu of the flexing operation previously described.

GENERAL CONSIDERATIONS

In general, the ordered sequence for aligning the various members and the substrate 30 may be altered without adverse effect. Thus, the ordered sequence for overlaying respective members of the assembly may provide for the internesting of the plate 20 on the carrier member, first, and then the internesting of the substrate 30. Care must be taken, however, to insure contact between the corresponding mounting pads 28*a*, 28*b* and terminal pads 32*a*, 32*b*. With such an arrangement, the conjoining force required for maintaining contact between associated ones of the terminal and mounting pads may be provided by the gravitational weight of the substrate 30, thereby permitting the omission of the weight 14. The carrier member 10 may be incorporated as part of one or more of the other members of the fixture and electrode assembly without adverse effect so long as adequate alignment protrusions are therein provided as previously described.

It has been found that greater vertical spacing accuracy may be achieved between the planar grids surfaces 22*b* and the indicia 34 by properly selecting the material composition of the plate 20. Preferably, the plate material comprises a resilient material composition, such as, for example, a controlled expansion type nickle-iron alloy which possesses a thermal coefficient of expansion slightly greater than that possessed by the substrate material upon which the grid electrodes are mounted. When the respective mounting pads 28*a*, 28*b* are secured to the terminal pads 32*a*, 32*b* in a heating operation, as for example, by brazing, a differential thermal expansion occurs between the plate material and the substrate material upon cooling which produces additional tightness or rigidity of the grid portions between the channel depressions. Also, the resiliency of the plate may be selected, as for example, by suitably adjusting the plate thickness (along axis Y—Y), to provide a spring-like tension which maintains the planar grid surfaces 22*b* in substantially fixed planar separation from the indicia 34.

In the manner herein described, a plurality of electrically isolated electrodes may be expeditiously and efficiently aligned, secured, and electrically interconnected with respect to a plurality of other corresponding electrically isolated electrodes. Also, the apparatus and method, herein described, permit the expeditious and accurate assembly of a plurality of electrode surfaces in substantially fixed spaced-apart relation.

What we claim is:

1. An electrical device including a plurality of electrically-isolated spaced-apart electrodes comprising:

a. a base member having a surface including a plurality of first electrode portions in juxtaposed relation to at least one series of a plurality of terminal pads along said surface;

b. a plurality of second electrodes each having an inner surface portion thereon facing corresponding ones of the first electrode surface portions in overlying relation thereto; said inner surface portion being in substantially fixed spaced-apart relation from said corresponding first electrode surface portions; each of said second electrodes including at least one channel-shaped depression therein, each of said channel-shaped depressions including a mounting pad opposite its region of lowest depression secured to corresponding ones of said series of terminal pads; said second electrode surface portions and said channel-shaped depressions being formed of a single plate of resilient material.

2. The electrical device of claim 1, wherein said first electrode surface portions are interposed between two series of said terminal pads, and wherein opposing ends of each of said second electrodes includes a channel-shaped depression having a mounting pad secured to corresponding ones of each of said series of terminal pads.

3. The electrical device of claim 2, wherein said plate of resilient material comprises a material composition possessing a thermal coefficient of expansion slightly in excess of that displayed by the base member.

4. The electrical device of claim 3, wherein said material composition of said terminal pads possesses a thermal coefficient of expansion substantially equal to that displayed by the material composition of said base member.

5. An electrode plate for mounting a plurality of electrodes and for retaining said electrodes in aligned relation during mounting of said electrodes to a surface of a base member comprising:

a single metallic plate including:

a. a frame portion;

b. a series of distinct electrode portions surrounded by said frame portion and extending between common opposing sides of said frame portion, each one of said electrode portions being retained in aligned relation to each of the other ones of the series by physical connection to said common opposing sides of said frame portion, c. a plurality of channel-shaped depressions each having a substantially U-shaped cross-section, said channel-shaped depressions extending across said electrode portions and frame portion, and located at least at opposing ends of each one of said series of electrode portions most proximate to said common opposing sides of said frame portion, said channel-shaped depressions including a mounting pad opposite its lowest depression for each of said electrode portions, each of said mounting pads including major exposed surfaces located in substantially fixed spaced-apart depressed locations from corresponding major exposed surfaces of each of said electrode portions by a distance corresponding to the depth of the channel-shaped depression;

d. regions of weakness along the common opposing sides of said frame portion between which said electrode portions are retained.

6. An electrode plate in accordance with claim 5, wherein said regions of weakness comprise a series of apertures.

* * * * *